(12) United States Patent
Beigel

(10) Patent No.: US 6,924,688 B1
(45) Date of Patent: *Aug. 2, 2005

(54) RECTIFYING CHARGE STORAGE DEVICE WITH ANTENNA

(75) Inventor: Michael L. Beigel, Encinitas, CA (US)

(73) Assignee: Precision Dynamics Corporation, San Fernando, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 10/713,915

(22) Filed: Jul. 1, 2003

Related U.S. Application Data

(63) Continuation-in-part of application No. 10/155,518, filed on May 24, 2002, now Pat. No. 6,642,782, which is a continuation of application No. 09/723,897, filed on Nov. 28, 2000, now Pat. No. 6,414,543.

(51) Int. Cl.⁷ .................................................. H03L 5/00

(52) U.S. Cl. ...................................... 327/330; 327/565

(58) Field of Search ............................... 327/330, 564, 327/565, 594

(56) References Cited

U.S. PATENT DOCUMENTS

| | | | |
|---|---|---|---|
| 3,813,927 A | 6/1974 | Furgason | |
| 3,840,800 A | 10/1974 | Laupman | |
| 4,333,072 A * | 6/1982 | Beigel | 340/10.34 |
| 5,731,691 A | 3/1998 | Noto | |
| 5,854,117 A | 12/1998 | Huisman et al. | |
| 5,915,197 A | 6/1999 | Yamanaka et al. | |
| 5,973,598 A | 10/1999 | Beigel | |
| 6,037,718 A | 3/2000 | Nagami | |
| 6,087,196 A | 7/2000 | Sturm et al. | |
| 6,414,543 B1 * | 7/2002 | Beigel et al. | 327/565 |
| 6,515,919 B1 * | 2/2003 | Lee | 365/192 |
| 6,642,782 B2 * | 11/2003 | Beigel et al. | 327/565 |

* cited by examiner

Primary Examiner—Kenneth B. Wells
(74) Attorney, Agent, or Firm—Kelly Lowry & Kelley LLP

(57) ABSTRACT

A composite rectifying charge storage device, consisting of a rectifier and capacitor which share common elements, is combined in a circuit with an antenna for remote energization in response to an external electromagnetic or electrostatic AC field. The energized composite device extracts power (voltage or current) and may be implemented in a variety of circuit configurations, such as a power supply for driving circuit components, e.g., radio frequency identification (RFID) circuitry, or for use in parameter sensing applications which may include a light emitting component, and others.

43 Claims, 6 Drawing Sheets

RECTIFYING CHARGE STORAGE DEVICE WITH ANTENNA

This is a continuation-in-part of U.S. Ser. No. 10/155,518, filed May 24, 2002, and now issued as U.S. Pat. No. 6,642,782 on Nov. 4, 2003, which in turn is a continuation of U.S. Ser. No. 09/723,897, filed Nov. 28, 2000, and now issued as U.S. Pat. No. 6,414,543 on Jul. 2, 2002.

BACKGROUND OF THE INVENTION

This invention relates generally to a composite rectifying charge storage device of the type having a rectifier and capacitor which share common elements, as described in U.S. Pat. No. 6,414,543 and U.S. Publication U.S. 2002/0140500 A1, and related circuit applications for using the composite device. More particularly, this invention relates to the composite rectifying charge storage device incorporated in a circuit arrangement with an antenna such as an inductive, capacitive, lumped element, or L-C resonant circuit for remote energization by an external electromagnetic or electrostatic AC field.

U.S. Pat. No. 6,414,543 and U.S. Publication U.S. 2002/0140500 A1, which are incorporated by reference herein, disclose embodiments for a composite rectifying charge storage element and related electronic circuits suitable for fabrication on various substrates, including flexible substrates, by various means including printing or other deposition techniques using organic conductors, semiconductors and insulators and other electronic materials suitable for deposition and use in electronic circuits. This rectifying charge storage element is disclosed for use as a power supply that extracts DC power (voltage and current) sufficient to power an electronic device from an AC input signal. The AC input signal may be derived from an inductive, capacitive, or L-C resonant circuit coupled to external AC electromagnetic field or electrostatic AC field. The electronic circuit thus powered may comprise a radio frequency identification (RFID) circuit.

In this regard, most electronic circuits require a source of DC voltage with sufficient current output to power the circuit elements. Many of these circuits derive DC power by rectifying and filtering an AC power input signal Often, the AC signal is provided to the circuitry by electromagnetic coupling. For example, a passive RFID tag system must be capable of receiving power from an RFID reader to the RFID tag via an inductive (H-field) or electric field (E-field) coupling, and transmitting data from the tag to the reader also via inductive or electric field coupling. The activation field frequency for typical RFID devices may range from less than about 100 kHz up to more than about 30 MHz if inductive or capacitive coupling is utilized, and up to the UHF and microwave region if electric field RF antenna coupling is used. In current industry practice, operating power to a passive RFID tag or other electronic circuit is derived by utilizing a rectifier device and a charge-storage device, typically a rectifier diode or combination of diodes connected to a charge storage capacitor or combination of capacitors. In the past, these elements have been implemented as separate components within a discrete circuit or silicon integrated circuit. See, for example, U.S. Pat. No. 4,333,072.

Recent advancements in circuitry manufacturing processes, applicable to RFID tag and similar electronic circuit systems, have enabled the production of electronic circuits on flexible substrates using thin film materials such as organic and polymer semiconductors and other substances that can be applied by techniques such as ink jet printing. A primary objective is to produce electronic devices that have operating characteristics similar to discrete or integrated silicon circuit technology sufficient to operate certain types of circuits while approaching the economy of printing processes. See, for example, U.S. Pat. Nos. 5,973,598 and 6,087,196.

The rectifying charge storage device disclosed in the above-referenced U.S. Pat. No. 6,414,543 and U.S. Publication U.S. 2002/0140500 A1 incorporates a rectifier component such as a rectifying diode in combination with a charge storage component such as a capacitor, wherein these components share one or more common elements resulting in a composite device that is particularly suited for economical manufacture as by printing processes or the like. In addition, the composite device in especially suited for support on a flexible substrate which may comprise an integral portion of the device. Moreover, the supporting substrate may also comprise an electrically operative portion of the device. However, this rectifying charge storage device has alternative uses in electronic circuitry other than as a power supply device.

SUMMARY OF THE INVENTION

In accordance with the invention, an improved composite rectifying charge storage device is provided of the type shown and described in U.S. Pat. No. 6,414,543 and U.S. Publication U.S. 2002/0140500 A1, wherein the composite device in combined in a circuit with an antenna, such as an inductive, capacitive, or lumped antenna circuit for remote energization in response to an external electromagnetic or electrostatic AC field. The energized composite device extracts power (voltage or current) and may be implemented in a variety of circuit configurations, such as a power supply for driving circuit components, e.g., radio frequency identification (RFID) circuitry, or for use in parameter or energy sensing and indicating applications which may include a light emitting component, and others.

The composite rectifying charge storage device includes a rectifier such as a diode and a capacitor having a common conductor. The capacitor has spaced-apart conductive surfaces or areas defined by this common conductor and a second conductor with a dielectric material therebetween. In one form, the common conductor may comprise the cathode or anode connection to the rectifying diode. In another form, the rectifier comprises a semiconductor material providing the dual functions of rectification and forming the dielectric material between the conductive plates of the capacitor. In either configuration, the device may be formed as by ink jet printing or the like onto a substrate which may comprise a flexible substrate. The substrate may be provided as a separate component having the rectifying charge storage device formed or mounted thereon. Alternately, the substrate can be formed integrally with the rectifying charge storage device, for example, by integrating the substrate with the dielectric material.

The composite device is connected in a circuit with an antenna to provide a power supply for driving other circuit components, such an RFID tag or the like, or a sensor component, or a light emitting device for generating a light output signal. Multiple composite devices may be arranged in stacked array, each associated with electrically isolated antenna elements, to provide a DC output voltage of increased magnitude or antenna characteristics of increased versatility or directionality for signal or energy pickup. Moreover, the composite device with antenna may be a resonant circuit.

Other features and advantage of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
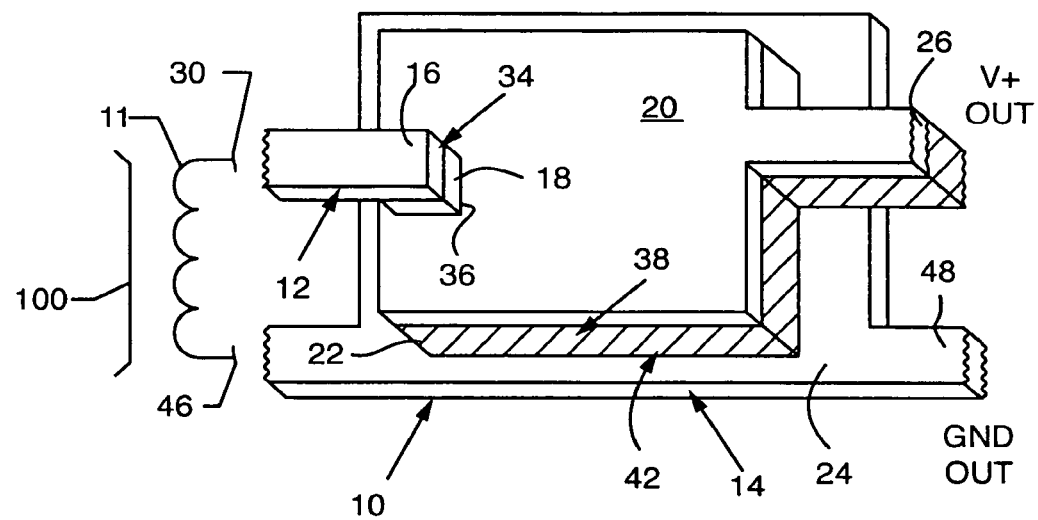
FIG. 1 is a somewhat schematic perspective view illustrating a composite rectifying and charge storage device constructed in accordance with the teachings of the invention, and incorporated in a circuit with an antenna.

As shown in the exemplary drawings, an improved composite rectifying charge storage device referred to generally in FIG. 1 by the reference numeral 10 is combined in a circuit with an antenna 11. The antenna 11 is designed to accommodate remote energization of the circuit in response to an external electromagnetic or electrostatic AC field 100. The composite device 10 is thus energized and functions to extract power (voltage or current) for appropriately driving circuit components. In one form, such circuit components may include a radio frequency identification (RFID) tag. In other forms, such circuit components may be adapted for response to monitored parameters, and/or include one or more light emitting components.

The rectifying charge storage device 10 corresponds generally with the device shown and described in parent U.S. Pat. No. 6,414,543 and in copending U.S. Publication U.S. 2002/0140500 A1, both of which are incorporated by reference herein. In this regard, as viewed in FIG. 1 with respect to one preferred form, the illustrative rectifying charge storage device 10 generally includes a diode rectifier 12 and a capacitor 14 which share common elements. The diode 12 includes a conductor 16 and a semiconductor 18. A common conductor 20 between the diode 12 and capacitor 14 is superimposed on a dielectric component 22 of the capacitor 14 which, in turn, is mounted on a second or ground conductor 24.

The conductor 16 is electrically connected to one terminal 30 of the antenna 11, and is electrically connected to one surface of the semiconductor 18 at a surface interface 34. The opposite surface of the semiconductor 18 is electrically connected to the common conductor 20 at a surface interface 36. The common conductor 20 is connected to the dielectric component 22 at a surface interface 38, and the conductor 24 is connected to the dielectric component 22 at a surface interface 42. The conductor 24 is connected to a second terminal 46 of the antenna 11 and also serves as the ground output terminal 48.

Rectification takes place between the conductor 16, the semiconductor 18, and the common conductor 20 through the interfaces 34 and 36. Charge storage takes place across the capacitor 14, between the capacitor plates defined by the common conductor 20 and the second conductor 24 with the dielectric component 22 disposed therebetween. The surface area of the rectifying component and 16, 34, 18, 36, and 20 interfaces is preferably minimized to reduce internal parasitic capacitor characteristics inherent in rectification. The surface area of the capacitive component interface provided by the common conductor 20 may be maximized to increase DC charge storage capacity. In this illustrative power supply application, the common conductor 20 provides the DC power output at a junction 26. The diode components may be fabricated from various materials, including inorganic semiconductor nanocrystals such as CdSe, InP, and others. Furthermore, conjugated polymers may be used, such as poly(phenylene-vinylene) (PPV), its derivatives and co-polymers (such as MEH-PPV (poly(2-methoxy, 5-(2'-ethyl-hexoxy)-p-phenylene vinylene))); polyfluorene (PF), its derivatives and co-polymers; polyparaphenylene (PPP), its derivatives and co-polymers; polythiophene (PT), its derivatives and co-polymers; and others.

The rectifying function of the diode 12 is implemented through the conductor 16 which serves as the anode and the common conductor 20 which serves as the cathode. The rectifying character of an organic or a polymeric diode usually requires conductors with different work functions for the anode and for the cathode. Organic and polymeric semiconductors are usually regarded as semiconductors with low doping concentration (usually in the range of ~$10^{13}$ $cm^{-3}$), hence the theory of p-n junction commonly used for inorganic semiconductor diodes is not applicable here.

For inorganic diodes, metal electrodes for the anode and cathode can be the same material with ohmic contacts to the p-type and n-type semiconductor, respectively. The rectifying behavior is from the p-n junction.

For organic semiconductors, the relative position of the work functions (or the energy level) of the metal electrodes to the energy levels of the conduction band and valence band of the organic semiconductor determines the rectifying behavior. The choice of anode hence is preferentially to be high work function metals such as gold, nickel, and their alloys. Alternatively, some metal oxides, including but not limited to indium tin-oxide, indium oxide, are also candidates for the anode material. For the cathode, the choice is preferentially low work function metals, including but not limited to calcium, lithium, magnesium, and others. Recently, the metal alloys consisting of a small amount of low work function metals, such as aluminum:lithium 3% alloy and 97% Al:LiF bilayer electrode, have become alternatives for the choice of cathode material.

In the case where the conductor 16 is formed from a relatively high work function metal such as a thin layer of aluminum or gold, a layer of low work function material is used for the common conductor 20. In this configuration, the conductor 16 comprises the anode connection to the semiconductor or diode component 18, with the common conductor 20 comprising the cathode connection to yield a composite device 10 having an electrical schematic as viewed in FIG. 2. Conversely, when the conductor 16 is formed from a low work function material, the common conductor 20 should be formed from a comparatively high work function metal such as aluminum or gold. In this latter configuration, the common conductor 20 comprises the anode connection for the semiconductor 18, and conductor 16 comprises the cathode connection, resulting in a composite device having an electrical schematic as viewed in FIG. 3.

Alternative organic semiconductors, referred to a high performance organic semiconductor devices, are shown and described in copending U.S. Ser. No. 10/218,141, filed Aug. 12, 2002, and incorporated by reference herein.

The materials for the capacitor dielectric 22 should be insulating materials, preferentially with a high dielectric constant to enhance its capacity. The structure of the capacitor 14 should provide a larger area compared to the diode. The dielectric 22 may be an organic or polymeric or inorganic insulator with reasonable dielectric constant. It should be large enough to hold enough charge, and it should also be small enough such that the device 10 has a fast response time. Currently, polymer materials such as polystyrene, polyethylene, and polycarbonate are ideal candidates. The dielectric 22 should be flexible where the other components of the device 10 are flexible. An organic semiconductor can also be used as the dielectric material provided that the conductors defining the capacitor 14 have the same work function.

In alternative configurations as shown and described in more detail in parent U.S. Pat. No. 6,414,543 and in copending U.S. Publication U.S. 2002/0140500 A1, the composite device 10 may be mounted onto a suitable substrate (not shown in FIG. 1) which may comprise a flexible substrate. Or, if desired, the substrate which may be flexible can be formed by a portion of the composite device 10, such as by incorporating the substrate directly into the dielectric component 22. Alternatively, or additionally, the dielectric component 22 may be defined by a combination semiconductor and dielectric layer for performing the dual functions of rectification and insulation between the capacitor plates. These features may be incorporated into a planar array, and may further include capacitor plates having an interdigitated configuration.

In accordance with the present invention, the circuit includes the antenna 11 and is adapted for remote energization inductively, electrostatically, or magnetically by means of the AC field 100 in communication with the antenna 11. Such AC field 100 may comprise a primary antenna in inductive or electric field-coupled relation with the circuit antenna 11, or an alternative AC field source. In use, the composite device 10 energized by the antenna 11 may be used as a power supply to provide a DC output voltage across the DC output junctions or terminals 26, 48 to drive one or more additional circuit components (not shown in FIG. 1) such as an RFID tag or the like. In the case of an RFID tag, the antenna 11 may act as a receiver for energizing the circuit including the composite device 10 and the RFID tag by extracting power from the AC field source, and also as a transmitter for sending data from the RFID tag to an RFID reader (not shown). Such antenna-based RFID tag systems utilizing integrated circuit components are generally shown and described in U.S. Pat. No. 6,181,287, which is also incorporated by reference herein.

Alternatively, the driven circuit component or components may comprise one or more sensor components powered via the antenna 11 coupled to the AC field source, for performing a variety of functions including but not limited to sensing and monitoring of a selected monitored parameter such as pressure, light, temperature, humidity, vibration, sound, a target chemical agent, or the presence of the AC field having a strength exceeding a predetermined threshold. More particularly, by way of example illustrative example, dielectric material 22 may comprise or incorporate a pressure sensitive conductive elastomer of the type described in U.S. Pat. No. 5,175,214, which is incorporated by reference herein. Or, the dielectric material 22 may comprise or incorporate an elastomer designed for undergoing a physical size change in the presence of a hydrocarbon, as described in U.S. Pat. No. 5,341,128, which is also incorporated by reference herein. In another exemplary alternative, the dielectric material 22 may comprise or incorporate a polymer capable of undergoing physical dimensional changes and/or electrical changes in response to the presence of a target chemical agent, as described in U.S. Pat. No. 5,512,882, which is incorporated by reference herein. In each such instance, the sensor component or components respond to the monitored parameter to alter electrical characteristics of the circuit, wherein such electrical characteristics can be monitored as a representation of the parameter. In still further alternatives, the composite device 10 may include one or more rectifying components and/or one or more capacitor components that emit light in response to circuit operation, for generating a light output signal that is representative of the monitored parameter, or alternately that comprises a transponded representation of the AC field signal. Exemplary photoemissive diodes are disclosed by way of example in U.S. Pat. No. 5,504,323, and exemplary photoemissive capacitors are disclosed by way or example in Japan Published Appln. JP2002152991 A2, both of which are incorporated by reference herein.

Figure 3:
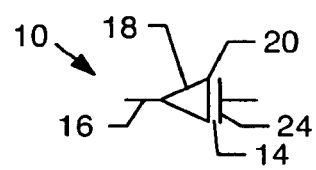
FIG. 3 is a circuit diagram illustrating the composite device of FIG. 1 in an alternative form.
Figure 4:
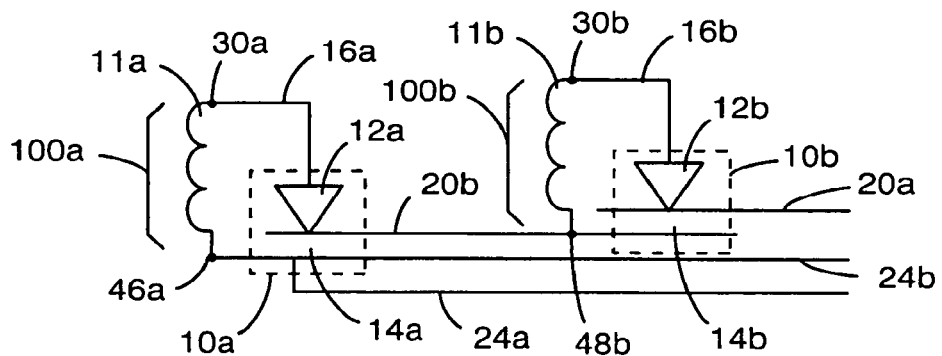
FIG. 4 is a schematic circuit diagram illustrating multiple composite devices in a stacked circuit array with multiple electrically isolated antennae associated respectively therewith.

FIG. 4 is a schematic circuit diagram illustrating one alternative preferred configuration of the invention in the form of a stacked power supply including multiple composite rectifying charge storage devices which are separately and individually energized by means of electrically isolated antennae, such as electrically isolated inductive antennae. In this configuration, the multiple composite devices provide a higher DC output voltage than can be developed with a single inductive antenna. The composite devices may be constructed in accordance with FIGS. 1–3 herein, or alternately in accordance with any one of the embodiments shown and described in the above-referenced parent U.S. Pat. No. 6,414,543 and copending U.S. Publication U.S. 2002/0140500 A1. The composite devices may also have preferred antenna attributes regarding directionality or polarization of the energizing field.

More particularly, as shown in FIG. 4, a pair of composite rectifying charge storage devices 10a and 10b are provided. The first composite device 10a includes a diode component 12a and a capacitor component 14a sharing a common conductor 20a. A conductor 16a couples the diode component 12a with one terminal 30a of an associated antenna 11a, with the opposite antenna terminal 46a being connected with a second conductor 24a of the capacitor component 14a. The second composite device 10b also includes a diode component 12b and a capacitor component 14b sharing a common conductor 20b. A conductor 16b couples the diode component 12b with one terminal 30a of an associated antenna 11b, which in turn has its opposite terminal 46b connected with a second conductor 24b of the capacitor component 14b. The two composite devices 10a and 10b are stacked by coupling the common conductor 20a of the first device 10a with the second conductor 24b of the second device 10b. With this arrangement, an increased or stacked DC voltage output is provided across the common conductor 20b of the second device 10b, and the second or ground conductor 24a of the first device.

In the presence of an AC field 100a of sufficient strength, the voltage across the antenna 11a is sufficient to forward bias the diode 12a causing current to flow into the common conductor 20a and the capacitor 14a. As a result, the first composite device 10a provides a DC output voltage across the conductors 20a and 24a. Importantly, the common conductor 20a is coupled to the second or ground conductor 24b of the second device 10b. In the presence of an isolated AC field 100b of sufficient strength, the voltage across the second antenna 11b is sufficient to forward bias the diode 12b causing current to flow into the common conductor 20b and the capacitor 14b. While this produces another DC output voltage across the conductors 20b and 24b associated with the second composite device 10b, an output voltage across the common conductor 20b of the second device 10b and the second or ground conductor 24a of the first device 10a represents the sum of the individual output voltages produced by the individual composite devices 10a, 10b. Accordingly, a higher power supply voltage can be developed in comparison with the capacity of a single inductive antenna. The stacked power supply may include additional composite rectifying charge storage devices in respective association with additional antennae for generating a further increased DC output voltage, if desired.

FIGS. 5–9 depict several additional circuit configurations incorporating one or more rectifying charge storage devices in association with an antenna 11 which is reactively or inductively coupled with a primary antenna 211 for driving coupled circuit components such as components of an RFID tag, and wherein the circuit is suitable for mounting on or incorporation with a flexible substrate such as a wristband or the like generally in accordance with the above-referenced U.S. Pat. No. 6,181,287. Once again, the composite devices may be constructed in accordance with FIGS. 1–3 herein, or alternately in accordance with any one of the embodiments shown and described in the above-referenced parent U.S. Pat. No. 6,414,543 and copending U.S. Publication U.S. 2002/0140500 A1.

Figure 5:
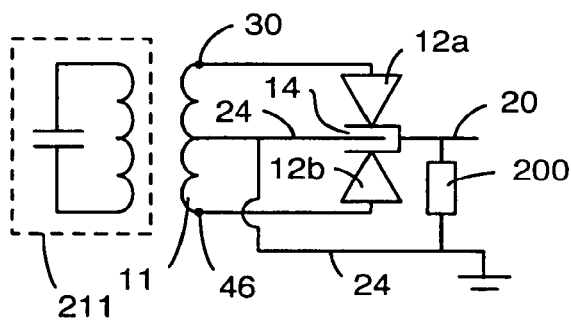
FIG. 5 is a schematic circuit diagram showing the composite device and antenna in one alternative preferred circuit configuration.

More particularly, FIG. 5 illustrates a pair of composite rectifying charge storage devices including a pair of diode components 12a and 12b sharing a common conductor 20 and a common capacitor component 14 with a second or ground conductor 24 connected with an inductive antenna 11 in a center tap arrangement. Terminals 30 and 46 at opposite ends of the antenna 11 are connected respectively to the anode junctions of the two diode components 12a and 12b. In this configuration, upon energization of the circuit by an AC field, which may be provided via a primary inductive antenna 211, wherein the two antennae 11 and 211 may be mutually coupled by inductive or capacitance or lump reactance. The thus-powered circuit acts as a full wave rectifier to provide a DC output voltage across the conductors 20 and 24, and is shown coupled to drive a load such as a modulator 200 of the type shown and described in the above-referenced U.S. Pat. No. 6,181,287, such as an FET or signal transmitting element. The circuit of FIG. 5 may also operate without the resonant antenna 211.

Figure 6:
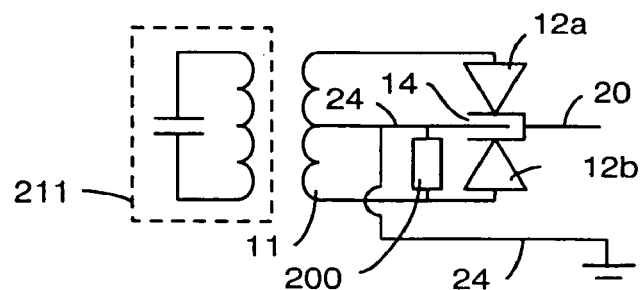
FIG. 6 is a schematic circuit diagram depicting the composite device and antenna in another alternative preferred circuit arrangement.
Figure 7:
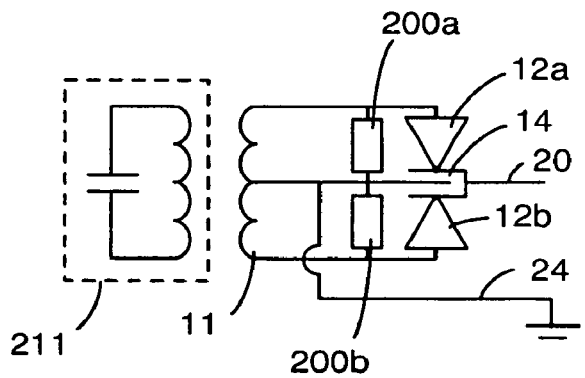
FIG. 7 is a schematic circuit diagram showing the composite device is still another preferred circuit configuration.

FIG. 6 shows a modified circuit arrangement similar to FIG. 5, but wherein the driven load such as a modulator 200 is coupled between the anode junction of one of the diode components 12a, 12b, such as the diode 12b as shown, and the second or ground conductor 24. FIG. 7 is a further modified configuration similar to FIG. 6, but including a pair of driven loads such as a first modulator 200a coupled between the anode junction of the first diode component 12a and the second conductor 24, and a second modulator 200b coupled between the anode junction of the second diode component 12b and the conductor 24. FIGS. 6 and 7 may also operate without the resonant antenna 211.

Figure 8:
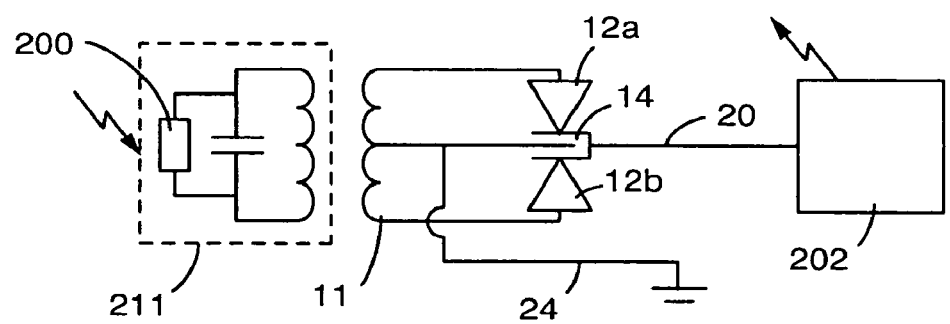
FIG. 8 is a schematic circuit diagram illustrating the composite device and antenna in a further alternative preferred form of the invention.

FIG. 8 illustrates a similar full wave rectifier circuit of the type depicted in FIGS. 5–7, with a driven load such as an RFID tag 202 as shown and described, for example, in the above-referenced U.S. Pat. No. 6,181,287. In this configuration, a tuned primary inductive antenna 211 is shown with a modulator 200 connected in parallel therewith for modulating the antenna signal. The circuit 202 provides a light output which is coupled optically to a light-sensitive switching element 200 across resonant circuit 211.

Figure 9:
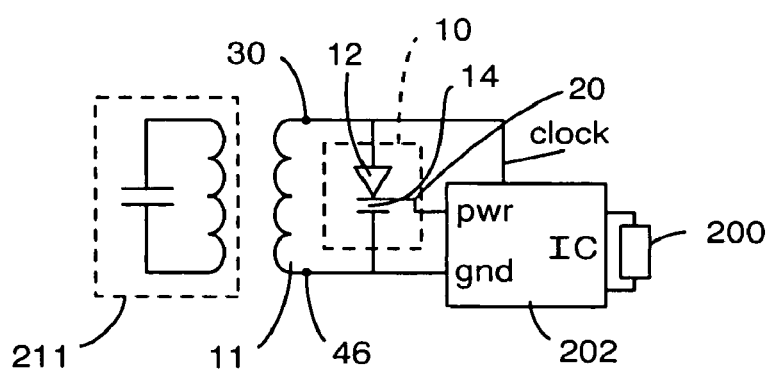
FIG. 9 is another schematic circuit diagram showing the composite device and antenna incorporated into another alternative preferred circuit arrangement.

FIG. 9 depicts a similar circuit arrangement in a half wave rectifier configuration with a single composite rectifying charge storage device 10 including a diode component 12 and a capacitor component 14. The composite device 10 is coupled with a tuned inductive antenna 11 for energization via a primary inductive antenna 211. A circuit load such as an RFID tag or integrated circuit 202 has a clock input connected with one terminal 30 of the antenna 11, and a ground input coupled to the opposite terminal 46 of the antenna. Power input to the integrated circuit is connected to the common conductor 20. The tag 202 includes solid state integrated circuit components as shown, and may be coupled with a data modulator 200. Once again, such RFID tags and data modulator circuit loads are shown and described in more detail in the above-referenced U.S. Pat. No. 6,181,287.

Figure 10:
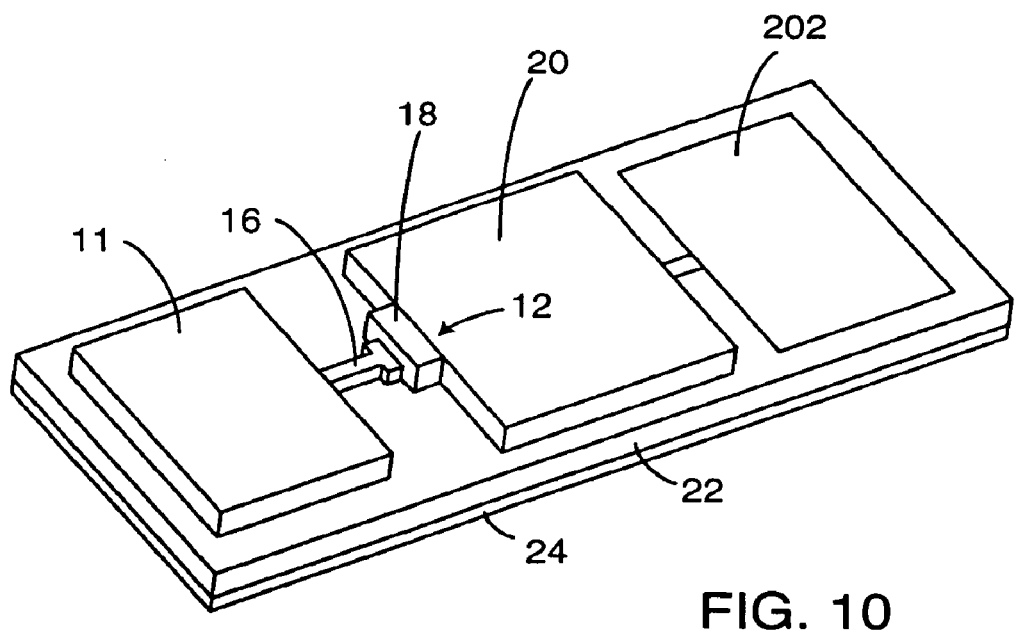
FIG. 10 is a perspective view showing a further alternative preferred embodiment of the invention with circuit components mounted onto a substrate which may be flexible.

An exemplary embodiment of the composite rectifying charge storage device with antenna in accordance with the present invention is illustrated in FIG. 10 for use in an RFID transponder power supply or the like. As shown the composite device comprises a diode component 12 preferably in the form of an organic semiconductor 18 mounted on a layer of dielectric material 22 forming a supporting substrate (which may be flexible) for the circuit components. An anode junction of the semiconductor 18 is coupled via a conductor 16 with a patch antenna 11 which is also mounted on the dielectric substrate 22. The opposite or cathode junction of the semiconductor 18 is coupled with a common conductor 20, also mounted on the dielectric substrate 22, forming one plate of the capacitor component 14. A second or ground conductor 24 forming the second plate of the capacitor component 14 is mounted on the dielectric substrate 22 on the opposite side thereof. A circuit load such as an RFID data and signal operating circuit 202 is connected with the common conductor 20. In operation, the RFID circuit 202 may communicate information with the patch antenna 11 either by variable loading through the composite device which will change the antenna's reflective characteristics, or by a signal generated by the RFID current in direct connection with the antenna (as viewed, for example, in FIG. 11).

Figure 11:
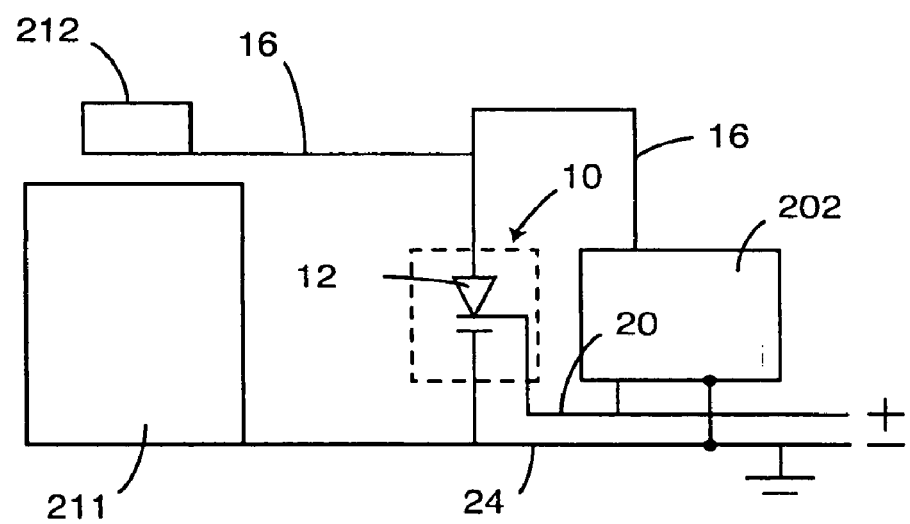
FIG. 11 is a schematic circuit diagram depicting the preferred alternative circuit configuration of FIG. 10.

FIG. 11 shows a schematic circuit diagram for an alternative embodiment similar to FIG. 10, but wherein the RFID circuit 202 is coupled directly with the patch antenna 211. In this variation, the RFID circuit 202 is connected to the DC output voltage produced by the composite device 10, by suitable connection across the conductors 20 and 24 (similar to FIG. 9). The patch antenna 211 is connected to the second or ground conductor 24, and a conductive element 212 of the patch antenna is connected by the conductor 16 to the diode component 12 of the composite device. In this arrangement, the patch antenna components 211, 212 provide a high frequency input power transducer for the RFID circuit 202. The composite device 10 supplies power to the RFID circuit 202, which may use backscatter connected through conductor 16 to the antenna circuit.

Figure 12:
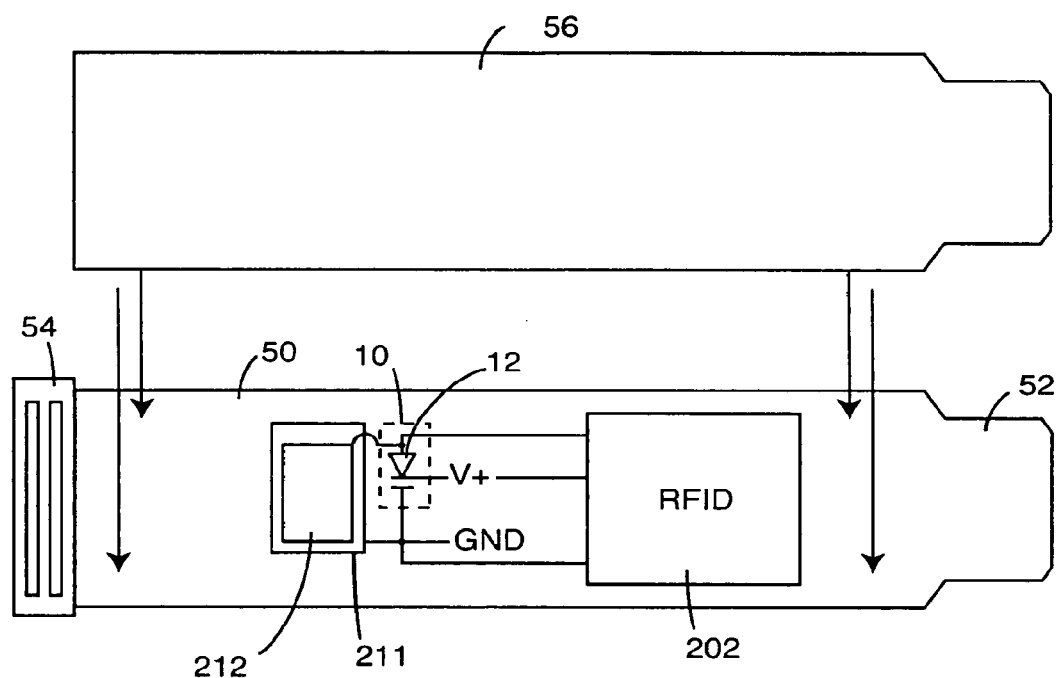
FIG. 12 is a somewhat schematic and partially exploded view illustrating the circuit embodiment of FIG. 11 incorporated into a wristband device.

FIG. 12 depicts the circuit of FIG. 11 embodied in planar array on a flexible substrate 50 such as a base layer formed from a flexible supporting material suitable for use as a wristband of the like. In this configuration, this substrate 50 is shown to include a male end component 52 for releasible engagement with a mating buckle component 54 at opposite ends thereof. FIG. 12 additionally shows a cover layer 56 which can be mounted onto the substrate 50 and suitably laminated thereto for sealing and protecting the underlying circuit components. The substrate 50 and cover layer 56 are preferably formed from a suitable insulative material or materials.

FIGS. 13–18 illustrate further alternative forms of the invention, wherein the antenna circuit includes one or more composite rectifying charge storage devices 10 wherein at least one diode component 12 thereof comprises a light emitting diode for producing a light output signal in response to circuit operation. This emitted light signal may be representative of a monitored parameter, or alternately may comprise a transponded representation of the AC field signal.

Figure 2:
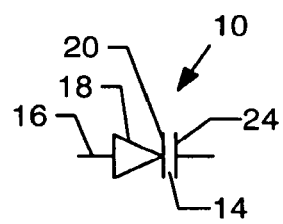
FIG. 2 is a circuit diagram illustrating the composite device of FIG. 1 in one form.

More specifically, the diode component 12 of the composite device 10 may comprise a light emitting diode (LED) for producing a radiant energy output signal when the device 10 is coupled via an antenna 11 to an inductive or other suitable AC field source, as by means of a primary inductive antenna 211 or the like. The primary antenna may be a resonant L-C circuit. The primary antenna 211 is optional. In accordance with one such configuration, the diode component 12 may be constructed generally according to FIG. 1, with the conductor 16 comprising an optically transparent or transmissive thin film conductive material such as indium tin oxide, or other suitable thin and optically transmissive metallic conductor, and the semiconductor 18 comprises a light emitting diode component such as an MEH-PPV polymer semiconductor or the like. In this arrangement, when the composite device 10 is coupled to an appropriate input signal, the semiconductor 18 emits a light output signal representative of the input signal. An electrical schematic of this composite device is illustrated in FIG. 2, it being recognized and understood that a reversal of the semiconductor anode/cathode connections will result in an electrical schematic as illustrated in FIG. 3.

Figure 13:
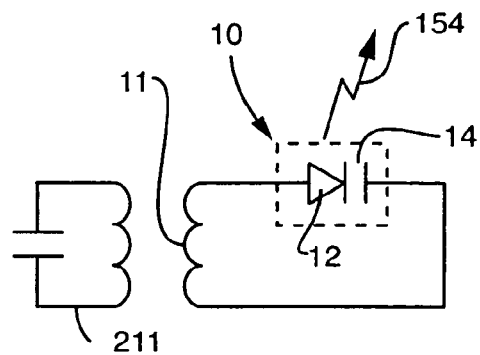
FIG. 13 is a schematic circuit diagram showing a further alternative preferred circuit arrangement corresponding with the invention, including the composite device connected in series relation with an antenna.
Figure 14:
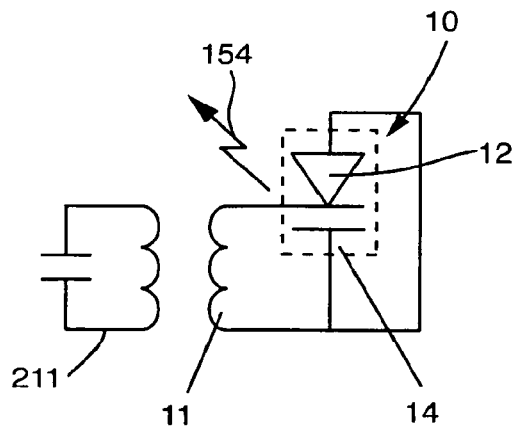
FIG. 14 is a schematic circuit diagram similar to FIG. 13, but illustrating the composite device connected in parallel relation with an antenna.

FIG. 13 is a circuit diagram illustrating the LED composite device 10 connected in series with an antenna 11 in a tuned resonant circuit for receiving an input (AC) signal in the form of an inductive or other suitable AC field as by means of a primary antenna 211. FIG. 14 is a circuit diagram showing a tuned resonant circuit with the composite device 10 connected in parallel with the antenna 11. In these circuit arrangements, the light emitting diode component 12 is responsive to the input signal to produce or emit an appropriate light output signal 154. This light output signal may be provided in the presence of a sufficiently strong input signal, and/or for producing a light modulated information signal proportional and thereby representative of a modulated input signal.

Figure 15:
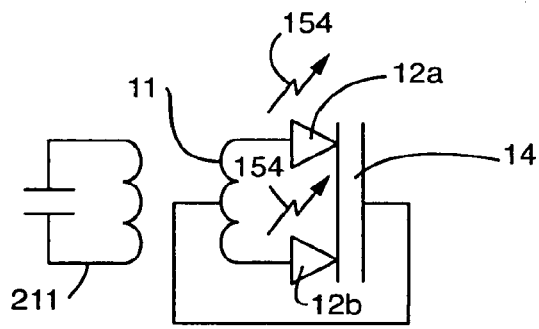
FIG. 15 is a schematic circuit diagram showing a pair of the composite devices in a full wave rectifier circuit connected with an antenna.
Figure 16:
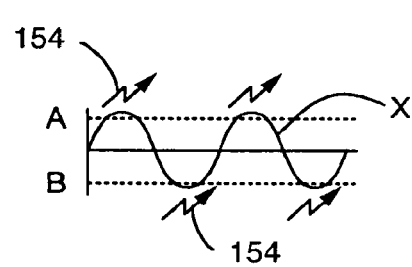
FIG. 16 is a waveform diagram illustrating operation of the circuit of FIG. 15.

FIG. 15 is another circuit diagram wherein a modified composite rectifying and charge storage device is provided in a full wave rectifier configuration. As shown, a pair of light emitting diode components 12a and 12b are connected with an inductive antenna 11 in a center tap arrangement, and are associated with a common capacitor 14. The diode components 12a and 12b are forward biased and energized in the presence of an input AC signal of sufficient field strength, as by coupling a primary antenna 211 with the inductive antenna 11. Related FIG. 16 is a voltage waveform chart wherein the waveform X represents the input AC signal, and wherein voltages A and B respectively represent threshold voltages for switching the two respective diode components 12a and 12b to an energized or "on" state when the waveform X exceeds the depicted thresholds. The light emitting diode components 12a, 12b generate light each time the waveform X exceeds the associated threshold.

Figure 17:
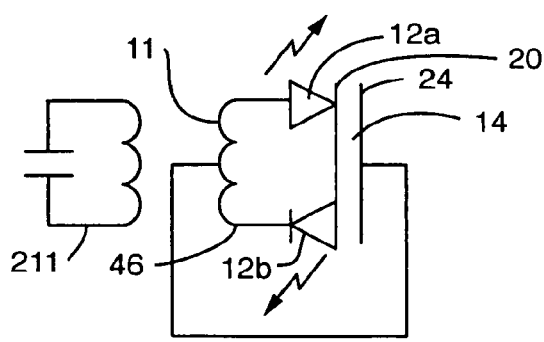
FIG. 17 is another schematic circuit diagram depicting a bistable edge driven circuit including a pair of the composite devices connected with an antenna.

FIG. 17 illustrates a circuit incorporating a modified composite device to provide a bidirectional edge driven rectifying and charge storage device. In this configuration, a pair of diode components 12a and 12b are coupled with opposite polarity between a common conductor 20 comprising one plate of a common capacitor 14, and the opposed terminal 30 and 46 at opposite end of an inductive antenna 11. A second or conductor 24 of the capacitor component 14 is coupled as a center tap to the antenna 11. The diode components 12a and 12b are alternately switched to a forward biased "on" state by means of an input AC field signal which may be transmitted to the antenna 11 by a primary antenna 211 or the like. An input AC field signal such as a sine waveform causes the diode component 12a to be switched to an "on" state with each positive-going peak of the waveform, as indicated by waveform, whereas the other diode component 12b is energized or switched to an "on" state with each negative-going peak of the waveform. With light emitting diode components 12a and 12b as shown, the two opposite-polarity diode components emit alternating light pulses as stimulated by waveforms of opposite polarization. In one form, the diode components 12a, 12b may comprise LED's for emitting light of different color.

A variety of further modifications and improvements in and to the composite rectifying charge storage device connected in a circuit with an antenna will be apparent to persons skilled in the art.

What is claimed is:

1. A circuit combination, comprising:
   a composite rectifying charge storage device including a rectifier structure fabricated with a common conductor forming a side of the rectifier structure, and a capacitor structure fabricated as a single unitary structure with the rectifier structure such that the capacitor structure incorporates the common conductor of the rectifier structure as a side of the capacitor structure, the capacitor structure to receive a rectified current from the rectifier structure over the common conductor; and
   an antenna coupled to said composite device.

2. The circuit combination of claim 1, wherein said antenna is adapted to extract power from a remote energization field for energizing said composite device.

3. The circuit combination of claim 1, further including a circuit component coupled to said composite device.

4. The circuit combination of claim 3, wherein the circuit component is powered by said composite device.

5. The circuit combination of claim 4, wherein said circuit component comprises an RFID tag.

6. The circuit combination of claim 5, wherein said RFID tag further includes a signal transmitter means coupled to said antenna.

7. The circuit combination of claim 6, wherein said signal transmitter means is coupled to said antenna by variable loading through said composite device.

8. The circuit combination of claim 6, wherein said antenna comprises a patch antenna, and further wherein said signal transmitter means is coupled directly to said patch antenna.

9. The circuit combination of claim 3, wherein said circuit component comprises a signal transmitting element.

10. The circuit combination of claim 3, wherein said circuit component comprises a sensor.

11. The circuit combination of claim 10, wherein said sensor comprises a pressure sensor.

12. The circuit combination of claim 10 wherein said sensor comprises means responsive to a target chemical agent.

13. The circuit combination of claim 1, wherein said capacitor structure comprises said common conductor, a second conductor, and a dielectric material disposed therebetween, said dielectric material incorporating a sensor for monitoring a target parameter.

14. The circuit combination of claim 13, wherein said sensor comprises a pressure responsive elastomer incorporated into said dielectric material.

15. The circuit combination of claim 13, wherein said sensor comprises an elastomer material incorporated into said dielectric material and adapted to undergo a physical size change in response to the presence of a target chemical agent.

16. The circuit combination of claim 13, wherein said sensor comprises a polymer material incorporated into said dielectric material and adapted to undergo electrical change in response to the presence of a target chemical agent.

17. The circuit combination of claim 3, wherein said circuit component comprises at least one photoemissive component.

18. The circuit combination of claim 17, wherein said at least one photoemissive component comprises a light emitting diode.

19. The circuit combination of claim 17, wherein said at least one photoemissive component comprises a light emitting capacitor.

20. The circuit combination of claim 1, wherein said composite device and said antenna are carried on a common substrate.

21. The circuit combination of claim 20, wherein said common substrate is a flexible substrate.

22. The circuit combination of claim 20, wherein said capacitor structure comprises said common conductor, a second conductor, and a dielectric material therebetween, said substrate being incorporated into said dielectric material.

23. The circuit combination of claim 20, wherein said common substrate comprises a flexible wristband.

24. The circuit combination of claim 1, further including an AC field signal coupled to said antenna.

25. The circuit combination of claim 23, wherein said AC field signal comprises an inductively coupled signal.

26. The circuit combination of claim 24, wherein said AC field signal comprises an electromagnetic signal.

27. A circuit combination, comprising:
   a composite rectifying charge storage device comprising a unitary element including a rectifier, a common conductor connected to one side of said rectifier, and a capacitor incorporating said common conductor;
   an antenna coupled to said composite device for energizing said composite device by extracting power from a remote energization field; and
   at least one circuit component coupled to said composite device.

28. The circuit combination of claim 27, wherein said circuit component comprises an RFID tag.

29. The circuit combination of claim 28, wherein said RFID tag further includes signal transmitter means coupled to said antenna.

30. The circuit combination of claim 27, wherein said circuit component comprises a signal transmitting element.

31. The circuit combination of claim 27, wherein said circuit component comprises a sensor.

32. The circuit combination of claim 27 wherein said circuit component comprises at least one photoemissive component.

33. The circuit combination of claim 32, including a plurality of photoemissive elements emitting different colors or wavelengths.

34. The circuit combination of claim 27, further including a common substrate carrying said composite device and said antenna.

35. The circuit combination of claim 34, wherein said capacitor structure comprises said common conductor, a second conductor, and a dielectric material therebetween, said common substrate being incorporated into said dielectric material.

36. The circuit combination of claim 34, wherein said common substrate comprises a flexible wristband.

37. The circuit combination of claim 27 further including an AC field signal coupled to said antenna.

38. A circuit combination, comprising:
   a composite rectifying charge storage device comprising a unitary element including at least one rectifier component, a common conductor connected to one side of said at least one rectifier component, and a capacitor incorporating said common conductor;

an antenna coupled to said composite device for energizing said composite device by extracting power from a remote energization field; and at least one circuit component electrically coupled to said composite device.

39. A circuit combination, comprising:

a stacked series of composite rectifying charge storage devices each comprising a unitary element including a rectifier, a common conductor connected to one side of said a rectifier component, and a capacitor incorporating said common conductor and a second conductor and a dielectric material therebetween;

said stacked series of composite devices including a first composite device and a last composite device; and a plurality of antennae each coupled to a respective associated one of said composite devices for energizing said associated one of said composite devices by extracting power from a remote energization field to produce an individual voltage output across said common conductor and said second conductor of each one of said composite devices;

said common conductor of said first composite device being coupled to said second conductor of a successive composite device in said stacked series;

whereby a stacked output voltage representing the sum of said individual output voltages is provided across said common conductor of said last composite device and said second conductor of said first composite device.

40. The circuit combination of claim 39, wherein said last composite device comprises said successive composite device.

41. The circuit combination of claim 39, wherein said common conductor of said successive composite device is coupled to said second conductor of said last composite device.

42. The circuit combination of claim 39, wherein each of said antennae comprises a directional antenna.

43. The circuit combination of claim 39, wherein said antennae are electrically isolated.

* * * * *